United States Patent
Döring

(10) Patent No.: US 6,422,738 B2
(45) Date of Patent: *Jul. 23, 2002

(54) COMPACT CROSS-CHANNEL MIXER

(75) Inventor: Andreas Döring, Nürnberg (DE)

(73) Assignee: MAN Nutzfahrzeuge AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,914

(22) Filed: Sep. 24, 1999

(30) Foreign Application Priority Data

Sep. 25, 1998 (DE) .......................................... 198 44 075

(51) Int. Cl.[7] .......................... B32B 3/12; B21D 39/00; B01F 5/06
(52) U.S. Cl. ............... 366/337; 261/112.2; 502/527.18; 428/593
(58) Field of Search .................. 366/336, 337, 366/338, 339, 340; 138/40; 428/593, 594; 502/527.18; 261/112.2

(56) References Cited

U.S. PATENT DOCUMENTS

| | | | | |
|---|---|---|---|---|
| 3,281,307 A | * | 10/1966 | Moeller et al. | |
| 3,574,103 A | * | 4/1971 | Latkin | |
| 3,618,778 A | * | 11/1971 | Benton | |
| 3,871,624 A | * | 3/1975 | Huber et al. | |
| 3,887,664 A | * | 6/1975 | Regehr | |
| 4,296,050 A | * | 10/1981 | Meier | |
| 4,604,247 A | * | 8/1986 | Chen et al. | |
| 4,710,326 A | * | 12/1987 | Seah | |
| 4,719,090 A | * | 1/1988 | Masaki | |
| 4,832,998 A | * | 5/1989 | Cyron | 428/593 |
| 4,882,130 A | * | 11/1989 | Asai et al. | 502/527.18 |
| 5,102,743 A | * | 4/1992 | Maus et al. | 502/527.18 |
| 5,135,794 A | * | 8/1992 | Maus et al. | 502/527.18 |
| 5,139,844 A | * | 8/1992 | Maus et al. | 502/527.18 |
| 5,316,997 A | * | 5/1994 | Toyoda et al. | 502/527.18 |
| 5,328,774 A | * | 7/1994 | Maus et al. | 502/527.18 |
| 5,370,943 A | * | 12/1994 | Bruck et al. | 502/527.18 |
| 5,612,277 A | * | 3/1997 | Harkonen et al. | 502/527.18 |
| 5,846,495 A | * | 12/1998 | Whittenberger et al. | 502/527.18 |

FOREIGN PATENT DOCUMENTS

WO  WO91/16970  11/1991

* cited by examiner

*Primary Examiner*—Tony G. Soohoo
(74) *Attorney, Agent, or Firm*—R W Becker & Associates; R W Becker

(57) ABSTRACT

A compact cross-channel mixer having several stacked foils is provided whereby flow channels are formed due to a special profiling of the foils, e.g., a sine wave design. The flow channels of foils that are positioned on top of each other. The stacked foils that form a mixing element are rotated about the main flow direction.

5 Claims, 4 Drawing Sheets

MIXING DIRECTION

MIXING DIRECTION

COMPACT CROSS-CHANNEL MIXER

BACKGROUND OF THE INVENTION

The present invention relates to a compact cross-channel mixer having several stacked foils whereby flow channels are formed due to a special design of the foils, e.g., a sine wave design, and whereby the flow channels of foils that are positioned on top of each other cross each other.

A cross-channel mixer is known from WO 91/16 970, in which each mixing element is composed of a foil package. The foils are provided with a corrugated shape so that flow channels are formed when the foils are stacked onto each other. These flow channels are positioned cross-wise when the foils are stacked. When mixtures of fluids and suspended solids flow through, homogenizing occurs in the stacking plane. In order to achieve a thorough mixing in the radial and circumferential direction, several, however at least two, of these equally designed mixing elements are tacked on top of each other such that their stacking planes are rotated, e.g. by 90°. Because of two or more mixing elements arranged in series, such a mixer is not only expensive but also requires a large mounting space, which causes problems with respect to the available mounting space, e.g., when they are mounted into exhaust gas systems of motor vehicles.

In contrast thereto, it is an object of the present invention to develop a cross-channel mixer which consists of a single mixing element only, however still achieves good homogenizing across the entire cross section.

SUMMARY OF THE INVENTION

This object is solved by the inventive cross-channel mixer in that the foils, which are stacked to form a mixing element, are rotated about the main flow direction.

By rotating the stacked foils about the main flow direction, a good mixing in the radial direction and in the circumferential direction is achieved without the necessity of stacking two or more mixing elements on top of one another.

It is advantageous to vary the gradient of the flow channels in order to facilitate machining of the foils because they have a tendency to shift off laterally when they are rolled at a steeper gradient.

An advantageous rotation is achieved when the foils are rotated about the main flow direction in an S-shape. Inhomogeneous fluid/suspended solids-mixtures applied in the vicinity of the axis of the mixing elements are distributed about the entire cross-sectional surface and are homogenized. Furthermore, the mixing path is expanded by the rotation.

A further advantageous embodiment is achieved when the wave crests of the stacked foils forming the flow channels are provided with slots at an angle relative to their main extension direction. An improvement in the radial mixing action is achieved by the slots.

The chemical reactions can be activated by coating the foils with a catalyst.

BRIEF DESCRIPTION OF THE DRAWINGS

The object and advantages of the present invention will appear more clearly from the following specification in conjunction with the accompanying schematic drawings, in which.

DESCRIPTION OF PREFERRED EMBODIMENTS

The present invention will now be described in detail with the aid of several specific embodiments utilizing FIGS. 1 through 5.

Figure 1:
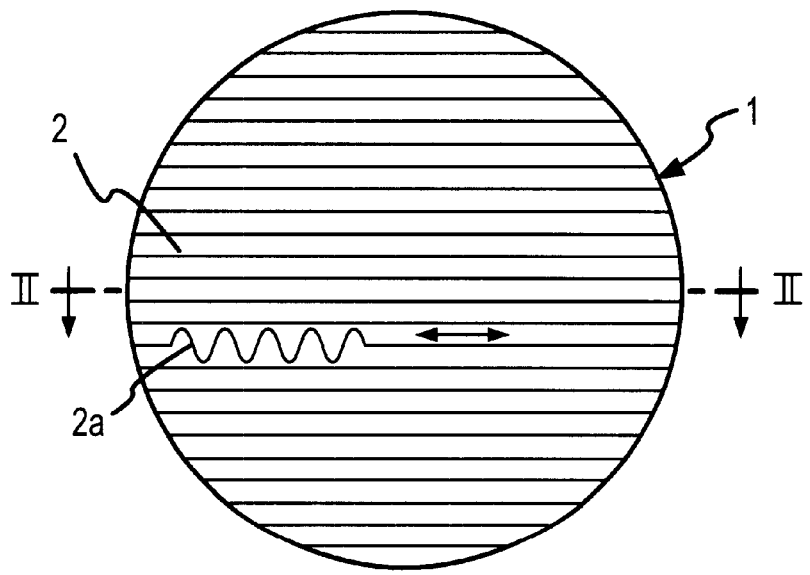
FIG. 1 shows a plan view of a cylindrical cross-channel mixer.

FIG. 1 illustrates, viewed in the main flow direction, a cylindrically designed mixing element 1 which is designed according to the prior art as a cross-channel mixer having foils 2 stacked on top of one another. The foils are, for example, shaped as a sine wave so that flow channels are formed when the foils 2 are stacked on top of one another to form a package. The wave-shaped design is indicated by a foil 2a. In order to achieve a mixing in the direction of the planes of the foils 2 the flow channels of two foils stacked on top of each other cross each other, as can be seen from FIG. 2. The mixing element 1 shown in FIG. 1 can, therefore, only carry out a mixing action in the direction of the foils 2 as it is indicated by an arrow. However, if a mixing action is also desired in other directions so that a thorough mixing is carried out about the entire cross-sectional surface, at least two of such mixing elements 1 have to be connected in series, rotated toward each other by 90°, which, of course, results in high costs and a large mounting space.

Figure 2:
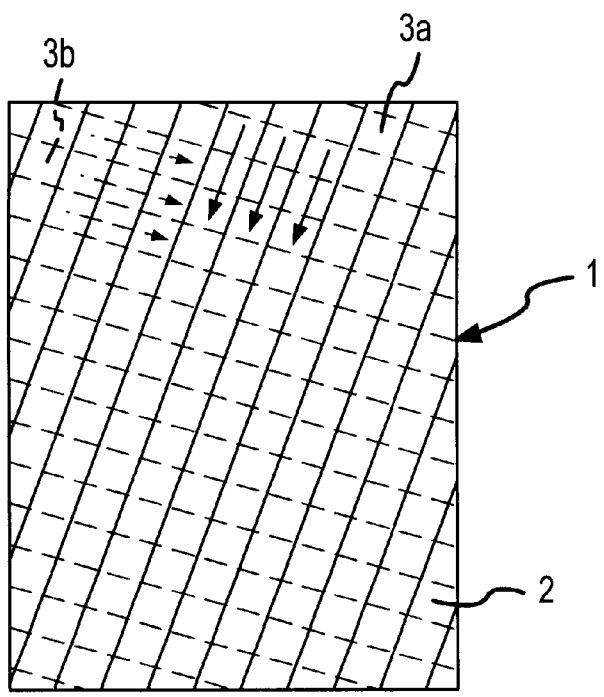
FIG. 2 shows a cross sectional view along line II—II showing the flow channels arranged cross-wise.

FIG. 2 shows a cross sectional view along line II—II of a foil 2 having flow channels 3a and a foil with flow channels 3b, whereby this foil is positioned underneath foils 2 and is indicated by dashed lines. The flow channels are arranged cross-wise in a known manner so that a mixing occurs in the plane of the foils.

Figure 3:
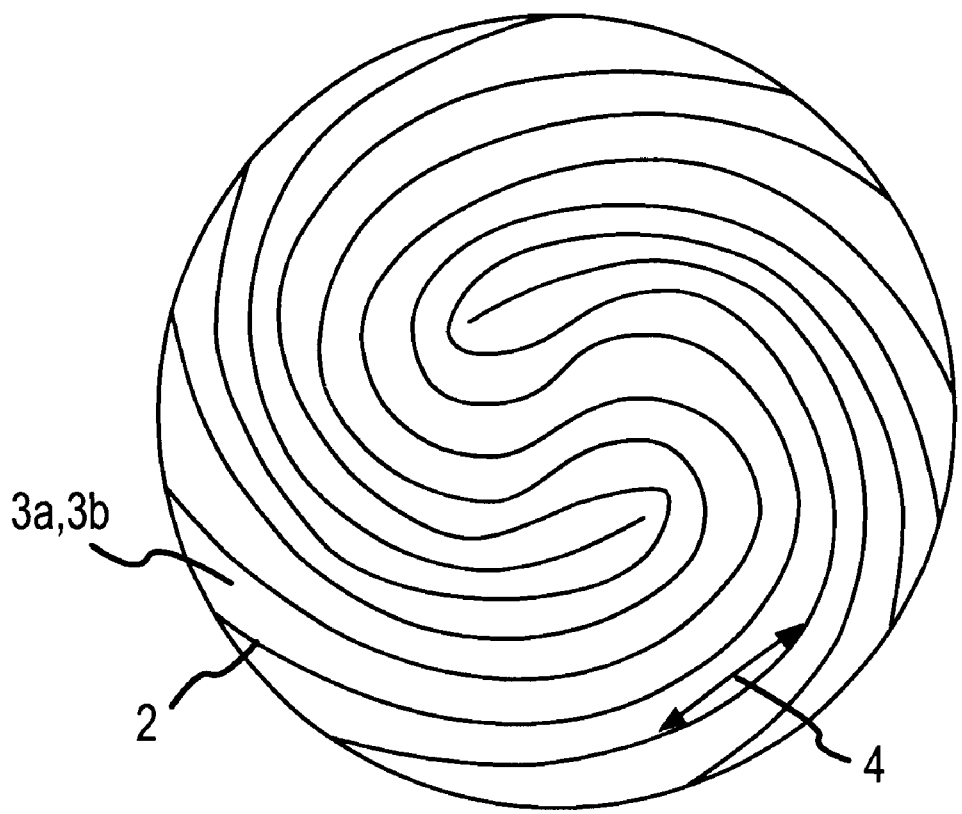
FIG. 3 shows an inventive cross-channel mixer with a foil rotated in an S-shape.
Figure 3:
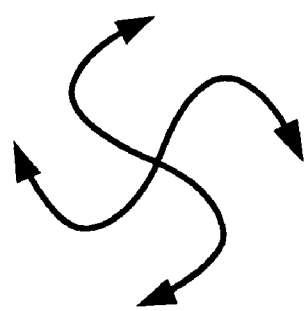

The general concept of the invention is illustrated in FIG. 3. The mixing element 1 is again composed of foils 2 which may have a wave-shaped design as they are shown in FIGS. 1 and 2. The space between foils stacked on top of one another forms flow channels 3a, 3b which are positioned cross-wise on top of one another as this can be clearly seen in FIG. 2. According to the invention, the foils forming these flow channels 3a, 3b are rotated about the main flow direction (in an S-shape in the shown embodiment). By this rotation, the planar mixing plane, as it is indicated by the arrows at reference numeral 4, is bent so that a thorough mixing can now also be carried out radially without the necessity to connect in series a second mixing element as this is required according to the prior art. The inventive mixing element, therefore, saves significant mounting space and costs.

Figure 4:
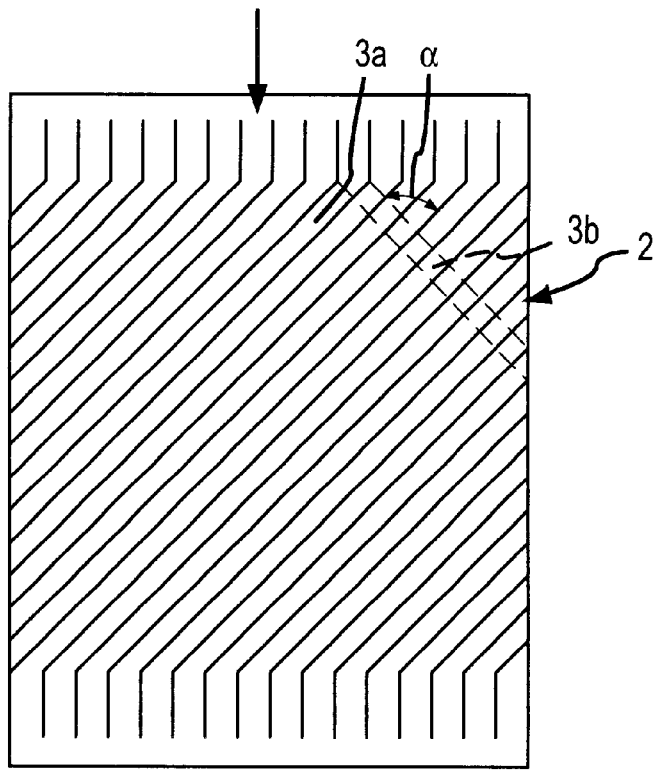
FIG. 4 shows a plan view of a foil having a variable gradient of the flow channels.
Figure 5:
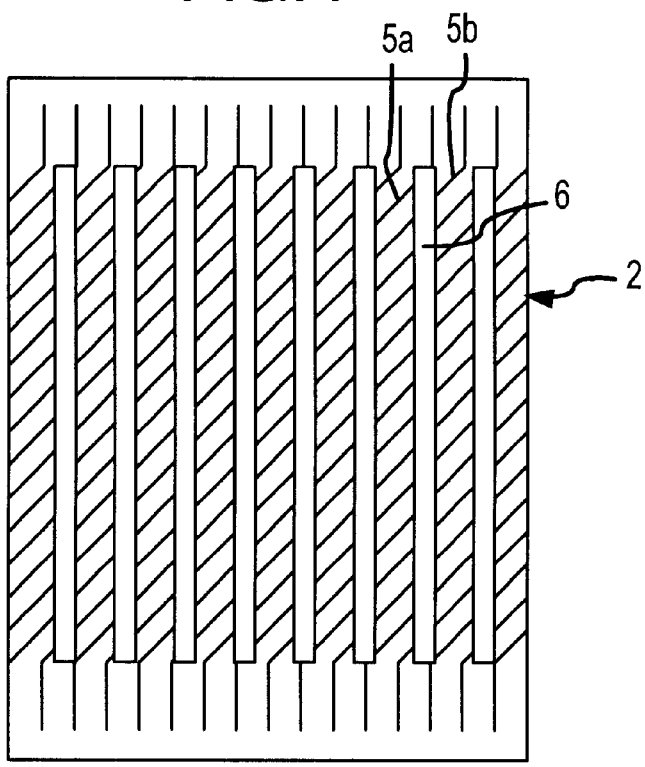
FIG. 5 shows a foil according to FIG. 4 in which the wave crests of the flow channels are provided with slots.
Figure 6:
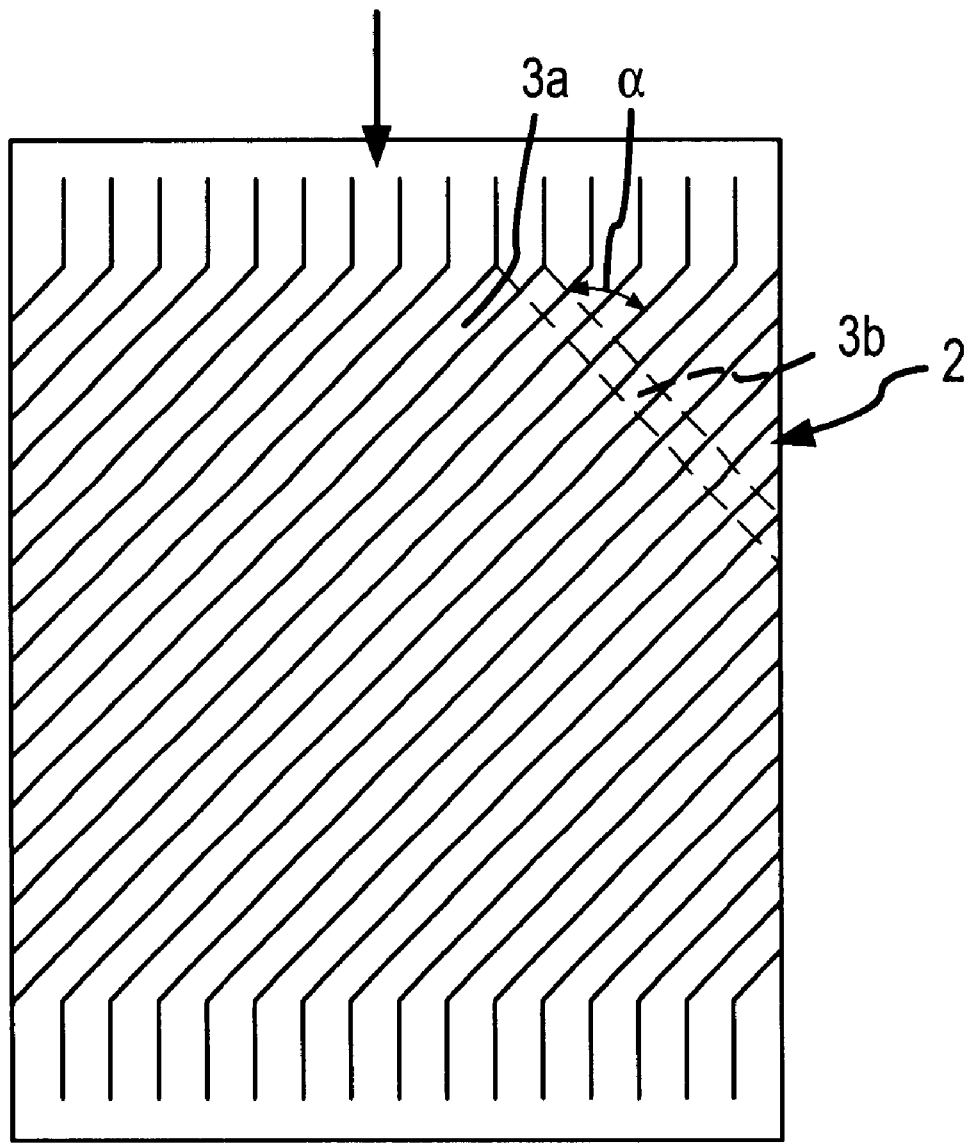
FIG. 6 shows how the gradient in the flow channels is varied during production of the foils.

An improvement of the radial thorough mixing can be achieved by providing slots in the flow channels 3a, 3b as is described with the help of FIGS. 4 and 5.

FIG. 4 shows a view of a foil 2 in which flow approaches in the main flow direction indicated by the arrow. The flow is diverted in the direction of the flow channels 3a. In the foil arranged underneath, the diversion is designed in the direction of the flow channels 3b which are indicated by dashed lines. The gradient of the channels 3a, 3b can be varied in order to facilitate the machining. When the gradient is large, the foils 2 attempt to shift during the rolling process, a fact that is difficult to control with the desired small thickness of the foils 2. However, a thicker design of the foils 2 increases the costs and the mounting space.

When slots 6 are formed in the foils, 2 according to FIG. 5, the wave crests selected representatively and designated by the reference numerals 5a, 5b are cut and an exchange of material can occur, perpendicular relative to the plane of the drawing, with the flow channels of the plane positioned underneath so that the radial mixing action described in FIG. 3 is intensified even further.

A further improvement can be achieved by coating the foils 2 with a catalyst. Thereby, the function of a chemical transformation is integrated into the mixer.

The inventive compact cross-channels mixer, therefore, permits homogenizing of a mixture about the entire cross section, requiring a small mounting space and low structural requirements and financial expenditure resulting therefrom.

The specification incorporates by reference the disclosure of German priority document 198 44 075.8 of Sep. 25, 1998.

The present invention is, of course, in no way restricted to the specific disclosure of the specification and drawings, but also encompasses any modifications within the scope of the appended claims.

What is claimed is:

1. A compact cross-channel mixer comprising:

a plurality of profiled foils stacked on top of one another to form a single mixing element, wherein said foils form flow channels, wherein said flow channels of successive foils cross one another, and wherein said plurality of foils are rotated about and angled relative to a main flow direction, said flow channels, said flow channels comprising wave crests having slots positioned at an angle to a main extension dircetion of said wave crests, wherein said slots run transversely to angles formed between said foils and said main flow direction, thereby rendering said foils bendable.

2. A compact cross-channel mixer according to claim 1, wherein a gradient of said flow channels is varied according to a thickness of said foils used in said mixer.

3. A compact cross-channel mixer according to claim 1, wherein said plurality of corrugated foils is rotated about said main flow direction in an S-shape.

4. A compact cross-channel mixer according to claim 1, wherein said plurality of foils is coated with a catalyst.

5. A compact cross-channel mixer according to claim 1, wherein said profiled foils have an orientation having a sine wave configuration.

* * * * *